United States Patent [19]

Diekhaus et al.

[11] Patent Number: 5,206,000
[45] Date of Patent: Apr. 27, 1993

[54] PROCESS FOR THE RECOVERY OF RHODIUM FROM AQUEOUS SOLUTIONS CONTAINING RHODIUM COMPLEXES

[75] Inventors: Gerhard Diekhaus; Harald Kappesser, both of Oberhausen, Fed. Rep. of Germany

[73] Assignee: Hoechst Aktiengesellschaft, Fed. Rep. of Germany

[21] Appl. No.: 287,444

[22] Filed: Dec. 20, 1988

[51] Int. Cl.$^5$ .............................................. C22B 11/00
[52] U.S. Cl. ...................... 423/22; 423/DIG. 14; 502/30
[58] Field of Search .............. 423/22, DIG. 14; 502/22, 24, 25, 27, 28, 30, 34; 210/688

[56] References Cited

U.S. PATENT DOCUMENTS

| | | | |
|---|---|---|---|
| 3,887,489 | 6/1975 | Fannin et al. | 502/24 |
| 4,021,463 | 5/1977 | Kummer et al. | 502/27 |
| 4,113,754 | 9/1978 | Kummer et al. | 502/12 |
| 4,340,570 | 7/1982 | Davidson | 423/22 |
| 4,341,741 | 7/1982 | Davidson et al. | 423/22 |
| 4,434,240 | 2/1984 | Pugach | 502/25 |
| 4,659,682 | 4/1987 | Pugach | 502/24 |
| 4,731,485 | 3/1988 | Cornils et al. | 502/24 |

FOREIGN PATENT DOCUMENTS

| | | | |
|---|---|---|---|
| 0879601 | 8/1971 | Canada | 423/22 |
| 0147824 | 7/1985 | European Pat. Off. | 423/22 |
| 0206377 | 12/1986 | European Pat. Off. | 423/22 |
| 2911193 | 8/1980 | Fed. Rep. of Germany . | |
| 3443474 | 5/1986 | Fed. Rep. of Germany | 423/22 |
| 3626536 | 2/1988 | Fed. Rep. of Germany . | |
| 1542370 | 3/1979 | United Kingdom . | |

*Primary Examiner*—Michael Lewis
*Assistant Examiner*—Steven Bos
*Attorney, Agent, or Firm*—Jordan B. Bierman

[57] ABSTRACT

A process for the recovery of rhodium from aqueous solutions of complexes thereof wherein the solutions are treated with oxygen in the presence of a water soluble salt of a carboxylic acid and, in a second stage, further treated with a hypochlorite, whereby oil soluble rhodium compounds are formed which can readily be separated from the aqueous solution.

45 Claims, No Drawings

PROCESS FOR THE RECOVERY OF RHODIUM FROM AQUEOUS SOLUTIONS CONTAINING RHODIUM COMPLEXES

The present invention is directed to an improved process for recovering catalytic rhodium from complexes thereof; more specifically, recovering rhodium from aqueous catalysts.

BACKGROUND OF THE INVENTION

Rhodium complexes are extremely useful as catalysts in commercial processes for the production of many organic chemicals. DE-C1-26 27 354 describes hydroformylation wherein catalytically active rhodium complexes containing water-soluble sulfonated aryl phosphines are used as ligands.

Since rhodium catalysts are expensive, the economic visability of processes of the foregoing type depends upon substantially complete recovery of the rhodium from catalysts which have become inactive. As is generally known, use of such catalysts over a substantial period of time will reduce both their activity and selectivity. Contaminants in the reactants, chemical transformations of the complexes, reactions of the complexes with the reaction products, etc. all contribute to the irreversible poisoning and/or inactivation of the catalysts. Hence, it is necessary to take appropriate steps to regenerate these catalysts and return them to service in the reactions. In the past, the rhodium has been recovered and transformed into the catalytic derivative.

German Application P 36 26 536.5 teaches a method for recovering rhodium from such aqueous solutions. An excess based on the rhodium of a carboxylic acid having 7 to 22 carbon atoms is added to the complex-containing solution. An oxidizer, such as oxygen or air, is introduced into the mixture at 50° to 200° C. The rhodium precipitates as an insoluble compound and is separated thereby. Using this method, 90% or more of the original rhodium is recovered commercially.

BRIEF DESCRIPTION OF THE PRESENT INVENTION

The problem was, therefore, to overcome the shortcomings of the prior art methods described above and to effect separation of an extremely high percentage of the rhodium from its aqueous solutions by a simple means. Moreover, the process must produce rhodium in a form in which it can be readily reused as a hydroformylation catalyst.

The present invention comprises a first stage, wherein the complexes are reacted with oxygen and/or an oxygen-containing gas in the presence of a water soluble salt of a carboxylic acid. The acid has 7 to 22 carbon atoms and the reaction is carried out at 80° to 140° C. Thereafter, as a second stage, the resultant mixture is treated with a hypochlorite at 50° to 140° C. to form the composition containing the rhodium compounds.

The foregoing process not only recovers the desired rhodium in extremely high yields, but also produces it in a form which can be directly converted into an active hydroformylation catalyst. This can be done by a very simple treatment with carbon monoxide and hydrogen. If desired, this can be carried out in the presence of complexing agents.

It should also be appreciated that the treatment times are relatively short and, therefore, the economics of the process are improved. A further advantage of the present process is that no substances are produced during the reactions which require any particular or special treatment to avoid a deleterious effect on the environment.

DETAILED DESCRIPTION OF THE PRESENT INVENTION

Advantageously, the solutions which are to be treated by the present process contain between 10 and 2000 ppm by weight of rhodium complexes. Preferably, these complexes are compounds which are of the formula $HRh(CO)_xL_{4-x}$, X being an integer from 1 to 3. The groups designated by L, which may be the same or different, are water-soluble ligands, especially phosphines of the formula

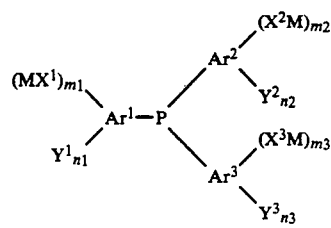

$Ar^1$, $Ar^2$, and $Ar^3$ individually represent phenyl or naphthyl; $Y^1$, $Y^2$, and $Y^3$ individually are straight or branched chain alkyl having 1 to 4 carbon atoms, alkoxy, halogen, OH, CN, $NO_2$, or $R^1, R^2 N$, where $R^1$ and $R^2$ are individually straight or branched chain alkyl having 1 to 4 carbon atoms; $X^1$, $X^2$, and $X^3$ individually denote carboxylate-$(COO^-)$ and/or sulfonate-$(SO_3^-)$; $n_1$, $n_2$, and $n_3$ are individually integers from 0 to 5; $m_1$, $m_2$ and $m_3$ are the same or different integers from 0 to 3, at least one number $m_1$, $m_2$ or $m_3$ being equal to or greater than 1. M is an alkali metal ion, the equivalent of an alkaline earth metal ion, or zinc ion, an ammonium ion, a quaternary alkyl ammonium ion of the general formula $N(R^3R^4R^5R^6)^+$, where $R^3$, $R^4$, $R^5$ and $R^6$ are each straight or branched chain alkyl having 1 to 20 carbon atoms, and equivalent thereof. Preferably, $R^3$ is straight or branched chain alkyl having 7 to 18 carbon atoms, and $R^4$, $R^5$, and $R^6$ are straight or branched chain alkyls having 1 to 4 carbon atoms.

Solutions which are operable in the present process can contain free excess ligands as well as their conversion and degradation products. Also, the starting materials, products of the catalyzed reaction, other additives used in the reaction (e.g. amphiphilic reagents), etc. can remain in the solution, depending upon their water solubility.

In the first stage of the reaction, oxygen (or an oxygen-containing gas such as air) is introduced into the complex solution in the presence of a water soluble salt of a carboxylic acid. This reaction takes place at 80° to 140° C. and preferably under pressures of 0.1 to 2.0 MPa. More preferably, the pressure is 0.2 to 1.0 MPa and, most preferably, it is 0.3 to 0.7 MPa.

It is also desirable that the total concentration of the salts in the solution not exceed 15% by weight. It has been found preferably that these concentrations be 3% to 12%, and most preferable that they be 5% to 10% by weight based on the total solution. It has been found feasible to adjust the salt concentration, if necessary, by adding an appropriate amount of water.

The carboxylic acid salt is desirably in the range of 20 to 500 mols of acid salt per atom of rhodium. The more preferred range is 40 to 300 mols and the most preferred range is 50 to 200 mols per atom of rhodium. The carboxylic acids which form the salts have 7 to 22 carbon atoms. The preferable acids are aliphatic, cycloaliphatic, aromatic, and/or aralphatic and have 8 to 13 carbon atoms. Of these, the monocarboxylic acids have been found especially useful, and the best are branched aliphatic monocarboxylic acids, particularly 2-ethylhexanoic acid, isononanoic acid, and isotridecanoic acid. The isononanoic and isotridecanoic acids advantageously are the reaction products of diisobutylene or tetrapropylene resulting from hydroformylation followed by oxidation.

It has been found convenient to introduce the oxygen-containing gas into the solution by the usual distributing means. Stirring is desirable, but not necessary. The pH for this first stage can be 4 to 8, preferably 5 to 7.5, and most preferably 5.5 to 7. The reaction time depends upon the temperature and the rate of oxygen introduced, and ranges usually from 1 to 3 hours.

After the foregoing first stage reaction, a second stage is carried out wherein hypochlorite is added to the reaction mixture. It is a feature of the present process that it is necessary to remove the various rhodium compounds and the like from the solution before carrying out the second stage. The hypochlorite can be added in the same reaction vessel immediately upon completion of the first stage. If any temperature adjustment is required, this should be carried out prior to the introduction of the hypochlorite.

As hypochlorites, the preferred compounds are those which are water soluble. In particular, hypochlorites of calcium, sodium, and potassium are desirable, as they are readily available commercially. The hypochlorite can be added as a solid, but it is more suitable to introduce it as a water solution. There is no criticality to the concentration, but care should be taken so that the complex solution is not excessively diluted.

The second stage reaction with hypochlorite may take place at 50° to 140° C., but 70° to 120° C. is preferred. Also, stirring has been found advantageous. As in the first stage, the reaction time varies depending upon the temperature. However, it is shorter than the first stage and usually is about 0.25 to 1.5 hours. For best results, it has been determined that the pH of the second stage reaction should be between 3 and 6, particularly between 4 and 5.

The oxygen and hypochlorites should be used in very great excess, based on the amount of rhodium present. In particular, 2 to 20 m$^3$ of oxygen per hours has been found suitable. For the hypochlorite, 150 to 350 mols per atom of rhodium has been found quite satisfactory. It should be noted that, since the amount of rhodium present in the complex solution is extremely small, the total amount of chemicals added is also very small, even considering the large excess which is recommended.

The process as described forms rhodium compounds which are insoluble in water and which precipitate as an oily layer separated from the aqueous solution. Due to their different densities and immiscibility, the separation is relatively easy. Alternatively, it has been found extremely convenient to extract the rhodium compounds by the use of a water-insoluble organic solvent. This solvent can be added at the beginning of the first stage with the original reactants, or can be added later on, even after the second stage is completed. It has been found preferable to add it at the end of the second stage.

Suitable solvents are aliphatic hydrocarbons, aromatic hydrocarbons, aliphatic carboxylic acids, or esters thereof, and aliphatic or cycloaliphatic ketones. The acids preferably have 5 to 10 carbon atoms, as do the ketones. Cyclohexane, benzene, toluene, and xylene have been found especially suitable. The most preferred solvent is toluene.

The foregoing extraction can take place between 10° and 100° C., preferably 40° to 60° C. The extraction can be repeated as many times as desired.

It has been found that the resultant solution in the organic solvent can be directly used as a catalyst component. Of course, it can also be transformed by reaction with carbon monoxide and hydrogen into a rhodium carbonyl compound. Alternatively, it can be reacted with aqueous solution of a desired phosphorus ligand to form the water-soluble rhodium complex.

The present process permits up to 95% of the original rhodium to be separated from the complex solution and reused as a catalyst for further reactions.

The following examples are intended to illustrate the invention, but are not to be considered limitative. Examples 1 to 3 relate to the treatment of a complex solution with oxygen alone, and without the second stage of the present invention. Example 4, on the other hand, is the second stage (hypochlorite) without the first stage. Examples 5 to 13 are in accordance with the two-stage process of the present invention.

EXAMPLES 1 to 3

The amount of 2-ethyl hexanoic acid and sodium-2-ethyl hexanoate set forth in Table 1 are added in each case to 1000 g of an aqueous solution containing 93 weight ppm of rhodium. The rhodium is complexed with trisodium-triphenylphosphine trisulfonate as a ligand and a total of 8.75% by weight of salts is in the solution. Over a period of 3 to 6 hours, and at a pressure of about 0.2 MPa, air is passed through the solution which has been heated to 100° to 120° C. A water-soluble rhodium compound forms which is separated by extracting twice with toluene. The residual rhodium content is determined in the remaining water phase. The reaction conditions and results of the tests are summarized in Table 1.

EXAMPLE 4

1000 g of the solution employed in the Examples 1 to 3 are used. After adjustment of the pH value of the solution by the addition of hydrochloric acid, the solution is heated to the reaction temperature and sodium hypochlorite is added with stirring as an aqueous solution. It contains 13% by weight of hypochlorite, based on the solution. The solution is left to after-react, cool and is extracted with toluene as in the Examples 1 to 3. The reaction conditions and results of the test are compiled in Table 2.

EXAMPLES 5 to 13

1000 g of the solution employed in Examples 1 to 4 are used in each case. The samples are initially treated under identical conditions with air. Then the solutions are reacted with sodium hypochlorite without prior separation of the precipitated rhodium compound. The reaction conditions and results of the tests are compiled in Tables 3a and 3b.

While only a limited number of specific embodiments of the present invention have been expressly disclosed, it is, nonetheless, to be broadly construed and not to be

TABLE 1

| Example | Na-2-ethyl hexanoate (mol/g-at Rh) | 2-ethyl hexanoic acid (mol/g-at Rh) | pH value | Temperature (°C.) | Pressure (MPa) | Air (m³/h · g-at Rh) | Time (min) | Rh in aqueous solution (weight ppm) |
|---|---|---|---|---|---|---|---|---|
| 1 | 150 | 20 | 6.19 | 100 | 0.2 | 14 | 180 | 12.9 |
| 2 | 150 | 20 | 6.50 | 120 | 0.2 | 14 | 360 | 5.0 |
| 3 | 150 | 20 | 6.50 | 100 | 0.2 | 14 | 360 | 5.7 |

TABLE 2

| Example | pH value | Temperature (°C.) | NaOCl (mol/g-at Rh) | Time* (min) | Rh in aqueous solution (weight ppm) |
|---|---|---|---|---|---|
| 4 | 5.0 | 100 | 645 | 10 + 15 | 13 |

*reaction and after-reaction time

TABLE 3a

| | | | treatment with air | | | | |
|---|---|---|---|---|---|---|---|
| Example | Na-2-ethyl hexanoate (mol/g-at Rh) | 2-ethyl hexanoic acid (mol/g-at Rh) | pH value | Temperature (°C.) | Pressure (Mpa) | Air (m³/h · g-at Rh) | Time (min) |
| 5–13 | 150 | 20 | 6.5 | 100 | 0.2 | 14 | 60 |

Example 3b - treatment with NaOCl

| Example | pH value | Temperature (°C.) | NaOCl (mol/g-at Rh) | Time (min) | Rh in aqueous solution (weight ppm) |
|---|---|---|---|---|---|
| 5 | 4.5 | 100 | 215 | 10 + 15 | 4.9 |
| 6 | 5.0 | 100 | 215 | 10 + 15 | 4.6 |
| 7 | 6.6 | 100 | 215 | 10 + 15 | 6.5 |
| 8 | 3.9 | 100 | 215 | 10 + 15 | 7.2 |
| 9 | 1.0 | 100 | 215 | 10 + 15 | 10.5 |
| 10 | 4.5 | 50 | 215 | 10 + 15 | 9.5 |
| 11 | 5.0 | 20 | 215 | 10 + 15 | 8.8 |
| 12 | 4.5 | 20 | 215 | 1440 | 8.1 |
| 13 | 4.5 | 100 | 22 | 10 + 15 | 8.5 |

What we claim is:

1. A process for the recovery of rhodium from aqueous solutions containing rhodium complexes comprising, in a first stage, treating said solutions at 80° to 140° C. with oxygen and/or an oxygen-containing gas in the presence of a water soluble salt of a carboxylic acid, which acid has 7 to 22 carbon atoms, to form a mixture and, in a second stage, treating said mixture with a hypochlorite at 50° to 140° C. to form a composition containing rhodium compounds.

2. The process of claim 1 wherein said first stage is carried out under pressure of 0.1 to 2.0 MPa.

3. The process of claim 2 wherein said pressure is 0.2 to 1.0 MPa.

4. The process of claim 3 wherein said pressure is 0.3 to 0.7 MPa.

5. The process of claim 1 wherein said water soluble salt is present in an amount of 2 to 500 mols per atom of said rhodium.

6. The process of claim 5 wherein said amount is 40 to 300.

7. The process of claim 6 wherein said amount is 50 to 200.

8. The process of claim 1 wherein said carboxylic acid is aliphatic, aromatic, cycloaliphatic, araliphatic having 8 to 13 carbon atoms or mixtures thereof.

9. The process of claim 8 wherein said carboxylic acid is monocarboxylic.

10. The process of claim 9 wherein said carboxylic acid is branched aliphatic.

11. The process of claim 10 wherein said carboxylic acid is taken from the class consisting of 2-ethylhexanoic, isononanoic, and isotridecanoic.

12. The process of claim 1 wherein said first stage is carried out at a pH of 4 to 8.

13. The process of claim 12 wherein said pH is 5 to 7.5.

14. The process of claim 13 wherein said pH is 5.5 to 7.

15. The process of claim 1 wherein said first stage is 1 to 3 hours.

16. The process of claim 1 wherein said hypochlorite is added to said mixture without prior removal of any water-soluble rhodium compounds formed.

17. The process of claim 1 wherein said hypochlorite is water soluble.

18. The process of claim 17 wherein said hypochlorite is added in the form of an aqueous solution.

19. The process of claim 1 wherein said hypochlorite is taken from the class consisting of calcium, hypochlorite, sodium hypochlorite, and potassium hypochlorite.

20. The process of claim 1 wherein said second stage takes place at 70° C. to 120° C.

21. The process of claim 1 wherein said second stage is 0.25 to 1.5 hours.

22. The process of claim 1 wherein said second stage is carried out at a pH of 3 to 6.

23. The process of claim 22 wherein said pH is 4 to 5.

24. The process of claim 1 wherein 2 to 20 m³ of said oxygen based on said rhodium is introduced into said solutions.

25. The process of claim 1 wherein 150 to 350 mols of said hypochlorite based on said rhodium is introduced into said mixture.

26. The process of claim 1 wherein said composition is an aqueous phase and an oily layer, said rhodium compounds being in said oily layer, and separating said phase and said layer by their different densities.

27. The process of claim 1 wherein a solvent for extracting said rhodium compounds is in said solutions.

28. The process of claim 27 wherein said solvent is added to said composition after said second stage.

29. The process of claim 27 wherein said solvent is taken from the class consisting of aliphatic hydrocarbons, aromatic hydrocarbons, aliphatic carboxylic acids having 5 to 10 carbon atoms, aliphatic carboxylic acid esters having 5 to 10 carbon atoms, aliphatic ketones having 5 to 10 carbon atoms, cycloaliphatic ketones having 5 to 10 carbon atoms, and mixtures thereof.

30. The process of claim 29 wherein said solvent is cyclohexane, benzene, toluene or xylene.

31. The process of claim 30 wherein said solvent is toluene.

32. The process of claim 27 wherein said rhodium compounds are extracted by said solvent at 10° to 100° C.

33. The process of claim 32 wherein said rhodium compounds are extracted at 40° C. to 60° C.

34. The process of claim 1 wherein said rhodium compounds are reacted with carbon monoxide and hydrogen to form rhodium carbonyl compounds.

35. The process of claim 1 wherein said rhodium compounds are reacted with an aqueous solution of a phosphorous ligand to form said rhodium complexes.

36. The process of claim 1 wherein said rhodium complexes are of the formula $$HRh(CO)_x L_{4-x}$$

wherein L, which may be the same or different, is a water soluble ligand and x is an integer from 1 to 3.

37. The process of claim 36 wherein said ligand is of the formula

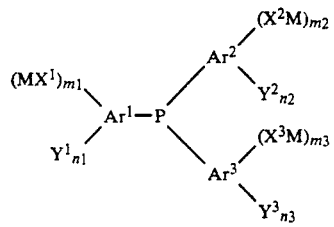

wherein $Ar^1$, $Ar^2$, and $Ar^3$ individually denote phenyl or naphthyl; $Y^1$, $Y^2$, and $Y^3$ individually are straight or branched chain alkyl having 1 to 4 carbon atoms, alkoxy, halogen, OH, CN, $NO_2$, or $R^1R^2N$, where $R^1$ and $R^2$ are individually straight or branched chain alkyl having 1 to 4 carbon atoms; $X^1$, $X^2$, and $X^3$ individually denote carboxylate ($COO^{31}$) or sulfonate ($SO_3^-$); $n_1$, $n_2$, and $n_3$ are individually integers from 0 to 5;

M is an ion selected from the class consisting of an alkali metal ion, an equivalent alkaline earth metal ion, a zinc ion, an ammonium ion, a quaternary alkyl ammonium ion of the general formula $N(R^3R^4R^5R^6)+$, where $R^3$, $R^4$, $R^5$ and $R^6$ are each straight or branched chain alkyl having 1 to 20 carbon atoms, $m_1$ $m_2$ and $m_3$ are individually integers from 0 to 3, at least one of $m_1$, $m_2$, and $m_3$ being at least 1.

38. The process of claim 36 wherein said solution contains excess free ligands.

39. The process of claim 38 wherein said excess free ligands are dissolved in said solution in the form of a metal salt selected from the group consisting of alkali metal salt, an equivalent amount of alkaline earth metal salt, a zinc salt, an ammonium salt, a quaternary alkyl ammonium salt.

40. The process of claim 39 wherein said salt is an alkali metal salt.

41. The process of claim 36 wherein L is a phosphine.

42. The process of claim 37 wherein $R^3$ is straight or branched chain alkyl having 7 to 18 carbon atoms; and $R^4$, $R^5$, and $R^6$ are individually straight or branched chain alkyl having 1 to 4 carbon atoms.

43. The process of claim 39 wherein said solutions contain a maximum of 15% by weight of said metal salts.

44. The process of claim 43 wherein said solutions contain 3% to 12% by weight of said metal salts.

45. The process of claim 44 wherein said solutions contain 5% to 10% by weight of said metal salts.

* * * * *